United States Patent [19]

Klüting

[11] Patent Number: 4,836,607
[45] Date of Patent: Jun. 6, 1989

[54] HINGE JOINT FOR THE SEATS OF MOTOR VEHICLES AND THE LIKE

[75] Inventor: Bernd Klüting, Radevormwald, Fed. Rep. of Germany

[73] Assignee: Keiper Recaro GmbH & Co., Remscheid, Fed. Rep. of Germany

[21] Appl. No.: 181,557

[22] Filed: Apr. 14, 1988

[30] Foreign Application Priority Data

Apr. 14, 1987 [DE] Fed. Rep. of Germany ....... 8705554

[51] Int. Cl.$^4$ ................................................ B60N 1/06
[52] U.S. Cl. ...................................... 297/355; 16/341; 297/374
[58] Field of Search ............... 297/354, 355, 361, 362, 297/364, 363, 374, 375; 16/341, 342, 284, 303, 341, 351, 235, 247, 255, 278, 279, 325

[56] References Cited

U.S. PATENT DOCUMENTS

| | | | |
|---|---|---|---|
| 3,801,155 | 4/1974 | Hodgen | 16/341 |
| 4,025,109 | 5/1977 | Klingelhöfer | 297/355 |
| 4,227,741 | 10/1980 | Gross et al. | 16/325 |
| 4,708,392 | 11/1987 | Werner | 297/355 |

FOREIGN PATENT DOCUMENTS 0048294 2/1980 European Pat. Off. .
975780 8/1962 Fed. Rep. of Germany .

Primary Examiner—James T. McCall
Attorney, Agent, or Firm—Peter K. Kontler

[57] ABSTRACT

A hinge joint wherein a first component is affixed to the body supporting portion and a second component is affixed to the back rest of a seat, particularly in a motor vehicle. The two components are articulately connected to each other by a pintle having a cylindrical portion journalled in a sleeve of the second component, and an eccentric conical portion journalled in a complementary hole of a spur gear forming part of the first component. A spring biases the conical portion into the hole, and the conical portion has an eccentric recess for a cylindrical portion of the sleeve. Such design of the pintle contributes to simplicity and to a reduction of space requirements of the hinge joint. The conical portion can move the spur gear of the first component radially relative to an internal gear of the second component when the pintle is rotated by a hand wheel or by a motor.

14 Claims, 2 Drawing Sheets

HINGE JOINT FOR THE SEATS OF MOTOR VEHICLES AND THE LIKE

CROSS-REFERENCE TO RELATED CASES

A hinge joint which is somewhat similar to the hinge joint of the present application is disclosed in commonly owned copending patent application Ser. No. 165,753 filed Mar. 9, 1988 by Hansjörg Walk and Heinz-Jürgen Wagner for "Hinge joint for the seats of automotive vehicles and the like" and in the patents and patent applications which are mentioned in the copending patent application 10 of Walk et al.

BACKGROUND OF THE INVENTION

The invention relates to hinge joints in general, and more particularly to improvements in hinge joints which can be utilized with advantages to establish pivotable connections between the body supporting portions and the back rests of seats, especially of seats in motor vehicles.

It is well known to pivotally connect the back rest to the body supporting portion of the driver's seat or another seat in a motor vehicle by a hinge joint wherein a first component or leaf is rigidly connected with (or forms an integral part of) the body supporting portion, a second component or leaf is rigidly connected with (or forms an integral part of) the back rest, and a coupling member in the form of a pintle forms an element of the means for adjustably connecting the two components to each other so that the second component can be pivoted to any one of a number of different angular positions and can be releasably locked in a selected angular position with reference to the first component. The connecting means can further comprise a set of mating gears and/or other suitable means for releasably holding the second component in the selected angular position with reference to the first component and the body supporting portion of the seat. It is further known to provide the coupling member with a frustoconical eccentric portion which is biased axially of the coupling member by a suitable spring and serves to move one element of the holding means radially of another element prior and/or during adjustment of inclination of the back rest. The frustoconical eccentric portion is received in a complementary frustoconical hole or bore of one of the components. Reference may be had, for example, to European Pat. No. 48 294 which further discloses that the eccentric portion of the coupling member is adjustable to permit a change of inclination of the back rest with a minimum of effort. Such adjustability is possible because the shaft which carries the eccentric portion is free to yield in the axial direction when the static friction between the eccentric portion and the adjacent surface is converted into sliding friction at the onset of an adjusting operation. The shaft further comprises a first coaxial (non-eccentric) portion which is journalled in the other component of the hinge joint, and such other component has a bearing sleeve which surrounds a part of the one component around the eccentric portion of the coupling member. A second concentric or coaxial portion of the coupling member is also rotatably journalled in the sleeve, and the two coaxial portions of the coupling member flank the frustoconical eccentric portion. Dual journalling of the sleeve is necessary in order to ensure that the axis of the eccentric portion will remain parallel to the pivot axis for the second component of the patented hinge joint.

Such design of the hinge joint is quite satisfactory; however, the bulk of the hinge joint in the axial direction of the coupling member is excessive, primarily because the two coaxial portions of the coupling member must be journalled in the other component of the hinge joint and such coaxial portions must be disposed at opposite axial ends of the frustoconical eccentric portion. It is desirable to keep the dimensions of the hinge joint to a minimum, especially if the hinge joint is used in the seat of a motor vehicle wherein the space is at a premium and wherein the back rest is normally mounted on two spaced-apart hinge joints. The axial length of the aforementioned bearing sleeve at least matches the combined axial length of the two coaxial portions and the frustoconical eccentric portion of the coupling member.

OBJECTS AND SUMMARY OF THE INVENTION

An object of the invention is to provide a hinge joint which is just as reliable and just as versatile as, but is more compact than, heretofore known hinge joints including that which is disclosed in European Pat. No. 48 294.

Another object of the invention is to provide a hinge joint which can compensate in a simple and efficient way for radial tolerances 10 between the elements of the means for releasably holding the two components of the hinge joint in selected angular positions relative to each other.

A further object of the invention is to provide the hinge joint with novel and improved components or leaves and with novel and improved means for movably coupling the components to each other.

An additional object of the invention is to provide a hinge joint wherein each of the components can be safely journalled on a single portion of the coupling member.

Still another object of the invention is to provide a hinge joint wherein the eccentric portion of the coupling member is mounted and maintained in a selected axial position in a novel and improved way.

The invention is embodied in a hinge joint, particularly for changing the mutual positions of two portions of a seat (such as the driver's seat or the passenger seat next to the driver's seat in a motor vehicle). The improved hinge joint comprises first and second components (e.g., a first leaf which is affixed to the body supporting portion of a seat and a second leaf which is affixed to and is pivotable with the back rest of the seat), and means for pivotally connecting the first and second components to each other. The connecting means comprises a coupling member (e.g., in the form of a pintle) which defines a pivot axis and comprises a first portion which is journalled in one of the components (e.g., in the second component) and whose axis coincides with the pivot axis, and a second portion which is eccentric to the first portion (i.e., whose axis is parallel to the pivot axis) and has a conical external surface. The other component has a hole for the second portion of the coupling member and a conical internal surface which surrounds the hole and is complementary to the external surface of the second portion of the coupling member. The one component has a hollow substantially cylindrical extension, and the second portion of the coupling member has an eccentric recess for the extension. The hinge joint further comprises means (preferably one or more diaphragm springs) for biasing the second portion of the coupling member into the hole of the other component. The connecting means further comprises means (such as a pair of mating gears) for releasably holding the components in selected angular positions relative to each other.

The extension can comprise a sleeve having a cylindrical portion in the recess of the second portion of the coupling member and a radially extending flange which is welded, bolted, riveted or otherwise affixed to the one component.

The coupling member can include a shaft which is coaxial and rigid or integral with the first portion of the coupling member, and a disc-shaped connector which non-rotatably secures the second portion of the coupling member to the shaft. The connector can have a polygonal hole and the shaft can include a polygonal end which is non-rotatably received in the polygonal hole so that the shaft and the connector cannot turn relative to each other. The connector is non-rotatably secured to the second portion of the coupling member.

The biasing means can include a spring (such as the aforementioned diaphragm spring) which pulls the second portion of the coupling member into the hole of the other component. The spring can react against the coupling means (e.g., against a shoulder of the aforementioned shaft) and bears against the extension or directly against the second portion of the coupling member. For example, the one component can be provided with a groove or with an otherwise configurated depression or seat for a portion of the spring.

A bearing (particularly an antifriction bearing) can be installed between the extension and the second portion of the coupling member.

The second portion of the coupling member can be mounted for reciprocatory movement relative to the first portion in the axial direction of the shaft. The spring in such a hinge joint can be caused to react against the aforementioned connector and can bear directly against the second portion of the coupling member. The connector can be rigidly affixed to the shaft and can carry one or more guide pins extending in parallelism with the axis of the shaft and reciprocably guiding the second portion of the coupling member. Alternatively, the pins can be provided on the second portion of the coupling member to be reciprocably received in complementary bores or holes of the connector.

The novel features which are considered as characteristic of the invention are set forth in particular in the appended claims. The improved hinge joint itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
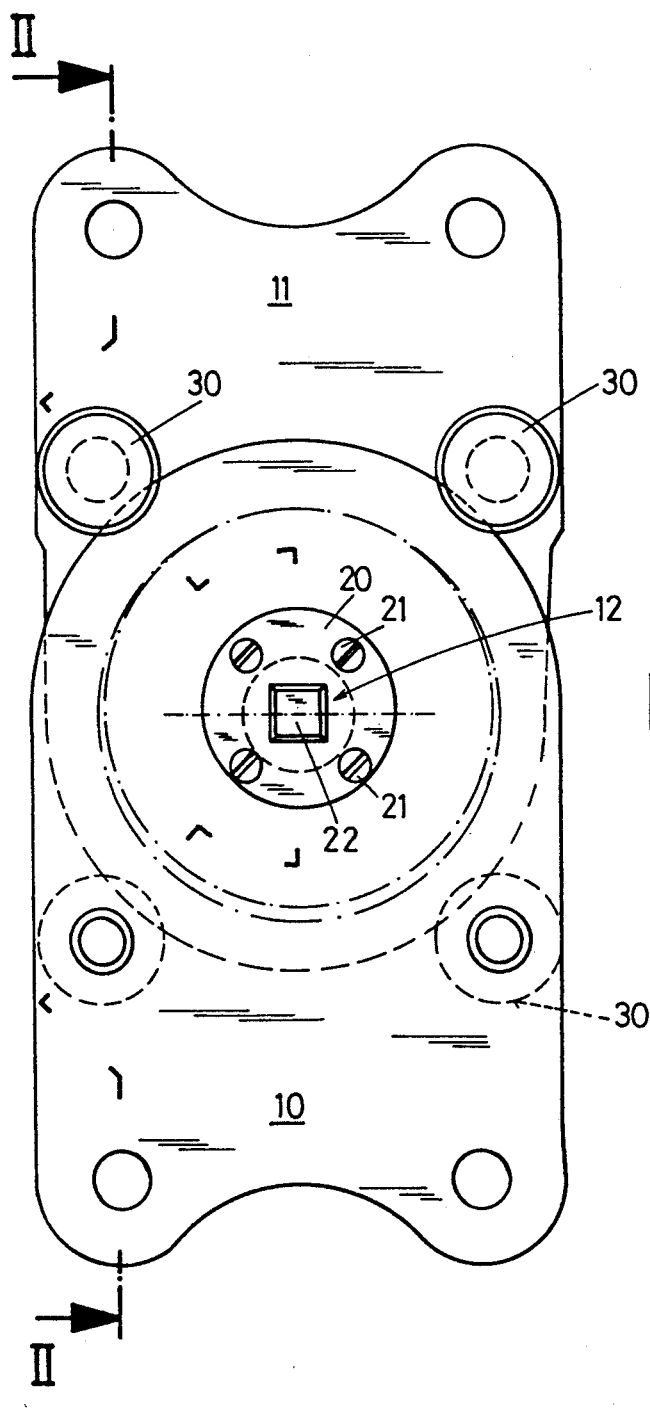
FIG. 1 is a side elevational view of a hinge joint which embodies one form of the invention and wherein the eccentric portion is rigid with the shaft of the coupling member.
Figure 2:
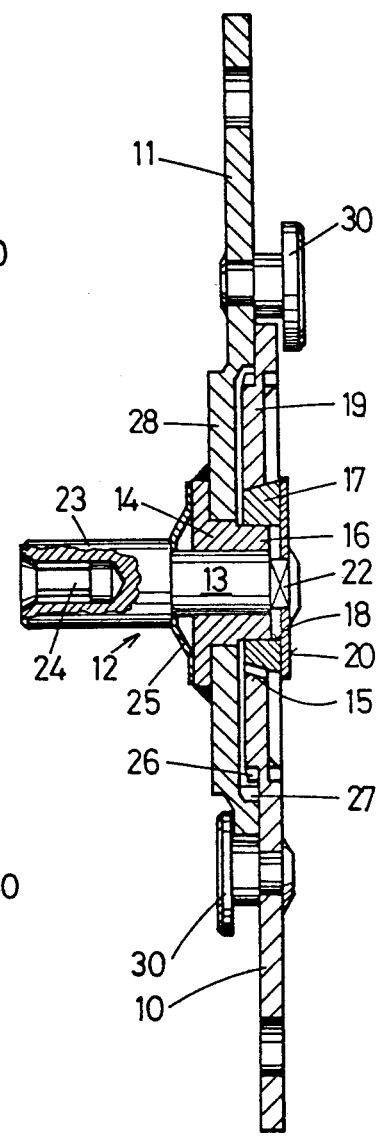
FIG. 2 is a sectional view substantially as seen in the direction of arrows from the line II—II of FIG. 1.

FIGS. 1 and 2 show a first hinge joint wherein a first component or leaf 10 is fixed to a stationary support, e.g., to the body supporting portion of the seat in a motor vehicle (such as a driver's seat or the passenger seat next to the driver's seat), a second component or leaf 11 is rigidly affixed to a movable part, particularly to the pivotable back rest of the seat in a motor vehicle, and the means for movably connecting the components 10, 11 to each other includes a coupling member 12 in the form of a pintle or shaft defining for the component 11 a substantially horizontal pivot axis and having a cylindrical first portion 13 rotatably journalled in a sleeve-like extension 14 which is welded or otherwise rigidly affixed to the component 11. The coupling member 12 of the connecting means further comprises a separately produced eccentric second portion 17 whose axis is parallel to the axis of the first portion 13 and which has a frustoconical peripheral surface complementary or substantially complementary to the frustoconical internal surface surrounding a bore or hole 15 in the component 10. The coupling member 12 further comprises a disc-shaped washer-like connector 20 which is secured to the conical second portion 17 of the coupling member by a set of screws 21 or similar fasteners and has a centrally located polygonal hole for a complementary polygonal end portion 22 of the coupling member 12 to thus ensure that the second portion 17 and the connector 20 must share all angular movements of the shaft of the coupling member 12. The end portion 22 of the coupling member 12 has an upset outer end which overlies the outer side of the connector 20 to thus ensure that the end portion 22 cannot be extracted from the hole of the connector 20 in response to the pull of a diaphragm spring 25 which reacts against an external shoulder of the coupling member 12 and bears against the radially extending flange of the extension 14 so as to pull the conical second portion 17 of the coupling member 12 into the hole 15, i.e., to the left as seen in FIG. 2.

The conical second portion 17 of the coupling member 12 has an eccentric cylindrical recess in the form of a through hole or bore 18 for the cylindrical portion 16 of the extension 14 on the component 11. The cylindrical portion 16 of the extension 14 stabilizes the conical portion 17 of the coupling member 12. The hole 15 for the conical portion 17 is provided in a spur gear 19 which constitutes an axially offset (e.g., extended or stamped) integral part of the component 10 and has an annulus of external teeth 26 at least one of which mates with two neighboring teeth 27 of an internal gear which is preferably an integral part of the component 11. The axis of the spur gear 19 coincides with the axis of the hole 15 for the conical portion 17. The component 11 comprises an axially offset disc-shaped portion 28 which is adjacent one side of the spur gear 19 and is welded to the extension 14. Rivets 30 are provided to hold the components 10, 11 against movement away from each other in the axial direction of the coupling member 12. The aforementioned gears constitute component parts of the means for releasably holding the component 11 in a selected angular position relative to the component 10. To this end, the number of teeth 27 exceeds, at least by one, the number of teeth 26 on the spur gear. Also, the diameter of the pitch circle of the internal gear exceeds the diameter of the pitch circle of the gear 19, at least by the height of one tooth 26 or 27. These features are fully described in numerous pending United States patent applications and in numerous granted United States and foreign letters patent of the assignee of the present application.

The coupling member 12 further comprises a second end portion 23 which is adjacent the shoulder for the diaphragm spring 25 and is provided with a blind bore or hole 24 for one end portion of a torque transmitting rod or bar (not shown) serving to transmit torque between the coupling member 12 of FIGS. 1-2 and the coupling member of the companion hinge joint (not shown) at the opposite side of the seat whose body supporting portion and back rest are respectively connected with the components 10 and 11. The torque transmitting member can be provided with axially parallel ribs which are received in complementary flutes provided in the surface surrounding the blind bore or hole 24 in the end portion 23 of the coupling member 12.

In the embodiment which is shown in FIGS. 1 and 2, the smaller-diameter portion of the diaphragm spring 25 reacts against the shoulder of the coupling member 12 and the larger-diameter portion of this spring bears against the radially extending flange of the extension 14. However, it is equally possible to mount the spring 25 in such a way that its smaller-diameter portion bears against the extension 14, and it is also possible to employ a different spring.

The coupling member 12 can be rotated (in a well known manner) by a hand wheel or by a motor whereby the static friction (under the action of the diaphragm spring 25) between the shaft and the adjacent parts is converted into sliding friction so that the axial component of the force acting radially upon the conical portion 17 is greater than the combined bias of the diaphragm spring 25 and sliding friction which assists the bias of this spring. Therefore, the coupling member 12 and its portions 13, 17 move in a direction to the right (as seen in FIG. 2) to thus reduce the magnitude of radially acting forces and allow for effortless or substantially effortless adjustment of inclination of the component 11 and back rest of the seat relative to the component 10. The conicity of the external surface of the portion 17 is selected in such a way that the static friction angle is within the self-locking range. While the angular position of the component 11 is being changed, the diaphragm spring 25 causes the coupling member 12 and its portion 17 to move axially back and forth to an extent which is a function of tolerances between the external teeth 26 of the spur gear 19 and the teeth 27 of the internal gear on the component 11.

Figure 3:
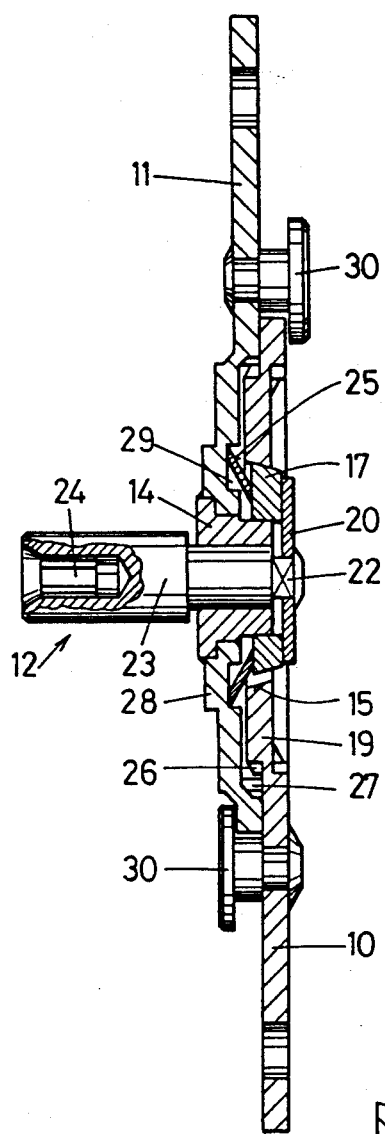
FIG. 3 is a similar sectional view of a second hinge joint wherein the means for biasing the eccentric portion of the coupling member into the hole of the other component is received in part in a depression of the one component.

FIG. 3 shows a hinge joint wherein all such parts which are identical with or clearly analogous to corresponding parts of the hinge joint of FIGS. 1-2 are denoted by similar reference characters. A difference between the two embodiments is that the conical portion 17 of the coupling member 12 of FIG. 3 tapers in a direction away from the disc-shaped portion 28 of the component 11 and the latter has a ring-shaped depression or seat in the form of a groove 29 for the larger-diameter portion of the diaphragm spring 25. The smaller-diameter portion of the diaphragm spring 25 bears directly against the adjacent side of the conical portion 17 and urges the latter into the complementary hole 15 of the spur gear 19, i.e., into the component 10. The diameter of the conical surface surrounding the bore or hole 15 also decreases in a direction away from the disc-shaped portion 28 of the component 11.

The components 10, 11 are held against axial movement away from each other by rivets 30, the same as in the embodiment of FIGS. 1 and 2. It will be noted that the larger-diameter heads of certain rivets engage the outer side of the component 10 whereas the larger-diameter heads of the remaining rivets engage the outer side of the component 11.

The mode of operation of the hinge joint of FIG. 3 is identical with or clearly analogous to that of the hinge joint of FIGS. 1-2.

Figure 4:
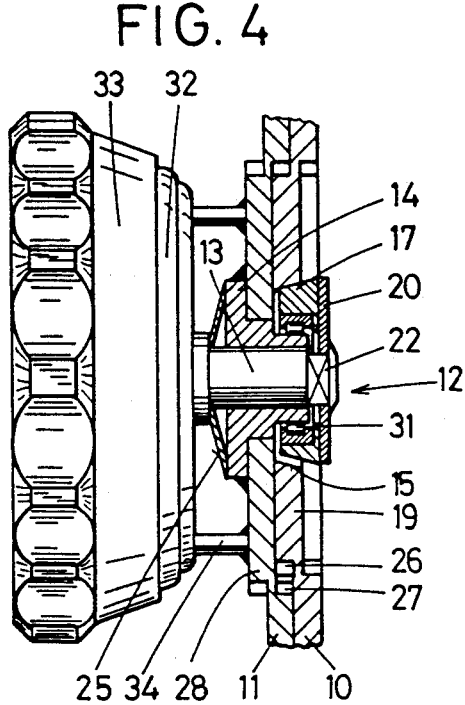
FIG. 4 is a fragmentary partly elevational and partly sectional view of a third hinge joint wherein the conical portion of the coupling member surrounds an antifriction bearing.

FIG. 4 shows a portion of a third hinge joint wherein a bearing 31 (preferably an antifriction ball, roller or needle bearing) is interposed between the cylindrical internal surface of the conical portion 17 and the cylindrical peripheral surface of cylindrical portion of the extension 14 on the disc-shaped portion 28 of the component 11. The bearing 31 further reduces friction when the coupling member 12 is rotated by a hand wheel 33 or by a motor (not shown) which can be provided in lieu of or in addition to the hand wheel. In view of a pronounced reduction of friction which is achieved by installing the bearing 31 between the conical portion 17 and the extension 14, the hinge joint of FIG. 4 is preferably further provided with a self-locking clutch 32 which operates between the hand wheel 33 (i.e., coupling member 12) and the component 11 of the hinge joint. A suitable self-locking clutch is disclosed, for example, in German Pat. No. 975 780 and such clutch can be disengaged by the hand wheel 33 to allow for angular displacement of the coupling member 12 for the purpose of enabling the person occupying the seat or another person to change the inclination of the component 11 relative to the component 10. The sleeve-like braking element of the clutch 32 is non-rotatably but axially movably secured to the component 11 by axially parallel pins 34.

Figure 5:
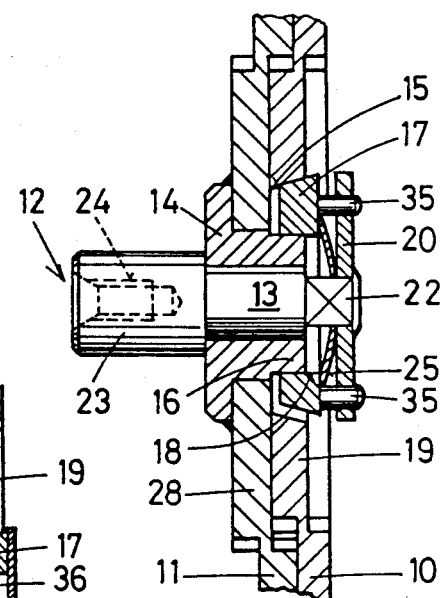
FIG. 5 is a fragmentary sectional view of a further hinge joint wherein the eccentric portion is reciprocable along the shaft of the coupling member.

Referring to FIG. 5, there is shown a fourth hinge joint wherein the conical portion 17 is axially movably (but non-rotatably) mounted on the shaft of the coupling member 12. This enables the major portion (including the portions 13 and 23) of the coupling member 12 to move axially relative to the conical portion 17 and/or vice versa. Consequently, the axial position of the shaft of the coupling member 12 can remain unchanged when this coupling member is caused to turn in order to effect a change of angular position of the component 11 relative to the component 10. The conical portion 17 has axially parallel guide pins 35 which are reciprocable in complementary axially parallel bores or holes of the connector 20; the latter is non-rotatably secured to the polygonal end portion 22 of the coupling member 12. The diaphragm spring 25 reacts against the connector 20 and bears directly against the adjacent side of the conical portion 17 to urge the external surface of the conical portion against the complementary surface surrounding the hole 15 in the spur gear 19 of the component 10. The conical portion 17 moves back and forth along the extension 14 of the component 11 when one of the mating gears on the components 10, 11 moves radially relative to the other gear while a person changes the inclination of the component 11. The conical portion 17 is mounted on the cylindrical portion 16 of the extension 14 in that the cylindrical portion 16 projects into the eccentric recess 18 of the conical portion 17, the same as in other embodiments of the improved hinge joint. The feature that only the conical portion 17 is caused to move axially when the angular position of the component 11 is being changed, while the major part of the coupling member 12 remains in a fixed axial position, contributes to simplicity of the hinge joint and reduces its space requirements in the axial direction of the coupling member 12.

The guide pins 35 can be affixed to the connector 20 and the conical portion 17 can be slidably mounted on such guide pins.

Figure 6:
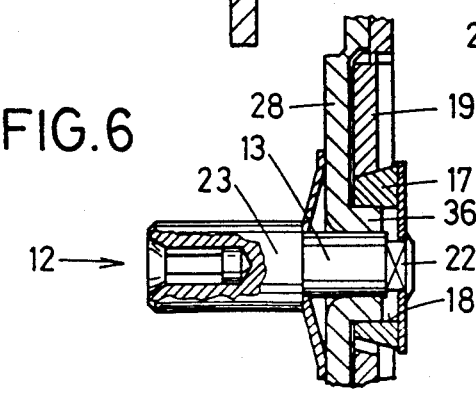
FIG. 6 is a sectional view of an additional hinge joint wherein the extension is an integral collar of the respective component.

In the embodiment of the hinge joint which is shown in FIG. 6, the extension 36 constitutes an integral collar of disc-shaped portion 28 of the component 11. In all other respects, the hinge joint of FIG. 6 is or can be identical with the hinge joint of FIGS. 1 and 2. If desired, a bearing (such as the antifriction bearing 31 of FIG. 4) can be installed between the collar 36 and the internal surface of the conical portion 17. The hole or recess 18 in the conical portion 17 has an axis which coincides with the axis of the cylindrical portion 13 but is parallel to the axis of the frustoconical peripheral surface of the portion 17.

An advantage of the improved hinge joint is that each of the components 10, 11 must only be mounted on a single portion (17, 13) of the coupling member 12. This renders it possible to employ a relatively short coupling member and to reduce the space requirements of the entire hinge joint (in the axial direction of the coupling member). In spite of such mounting of the components 10 and 11, the conical portion 17 and the remainder of the coupling member 12 are reliably held against tilting and/or other stray movements. Still further, the coupling member 12 is simpler and less expensive than a coupling member with two coaxial cylindrical portions or a coupling member with several conical portions, and the customary offset between the centers of cylindrical portions which develops as a result of manufacturing tolerances in the making of conventional coupling members can be avoided. Still further, the relatively simple extension 14 or 36 is much less expensive and less complex than heretofore used sleeves which are designed to surround two axially spaced apart coaxial portions of a conventional coupling member. All of the above features contribute significantly to lower cost and simplicity of the improved hinge joint as well as to a reduction of the time which is required to assemble the hinge joint.

The purpose of the torsion spring 25 (or any equivalent biasing means) is to eliminate radial play between the components 10, 11 and their parts in a selected angular position of the component 11 relative to the fixedly mounted component 10. As explained above, the spring 25 serves to urge the conical portion 17 deeper into the complementary hole 15 of the spur gear 19.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A hinge joint, particularly for changing the mutual positions of two portions of a seat, comprising first and second components; means for pivotally connecting said components with each other including a coupling member defining a pivot axis and comprising a first portion journalled in one of said components and a second portion eccentric to said first portion and having a conical external surface, the other of said components having a hole for said second portion and a conical internal surface bounding said hole and substantially complementary to said external surface, said one component having a substantially cylindrical extension and said second portion having an eccentric recess for said extension; and means for biasing said second portion substantially axially into said hole.

2. The hinge joint of claim 1, wherein said connecting means further comprises means for releasably holding said components in selected angular positions relative to each other.

3. The hinge joint of claim 1, wherein said extension includes a sleeve which is secured to said one component.

4. The hinge joint of claim 1, wherein said coupling member includes a shaft which is coaxial with and integral with said first portion, and a disc-shaped connector non-rotatably securing said second portion to said shaft.

5. The hinge joint of claim 4, wherein said connector has a polygonal hole and said shaft includes a polygonal portion non-rotatably extending into said polygonal hole.

6. The hinge joint of claim 1, wherein said biasing means includes a spring arranged to pull said second portion into said hole.

7. The hinge joint of claim 6, wherein said spring reacts against said coupling means and bears against one of the parts including said extension and said second portion.

8. The hinge joint of claim 1, wherein said biasing means includes a spring which bears directly against said second portion.

9. The hinge joint of claim 8, wherein said one component has a depression for a portion of said spring.

10. The hinge joint of claim 1, further comprising bearing means between said extension and said second portion.

11. The hinge joint of claim 10, wherein said bearing means includes an antifriction bearing.

12. The hinge joint of claim 1, wherein said coupling member further comprises a shaft which is rigid with said first portion and said second portion is reciprocable relative to said first portion in the axial direction of said shaft.

13. The hinge joint of claim 12, wherein said coupling member further comprises a connector mounted on said shaft, said second portion having at least one pin which is reciprocably guided by said connector, said biasing means including a spring reacting against said connector and bearing against said second portion.

14. The hinge joint of claim 12, wherein said coupling member further comprises a connector mounted on said shaft, one of the parts including said connector and said second portion having at least one pin extending in parallelism with the axis of said shaft and being reciprocable in the other of said parts, said biasing means comprising a diaphragm spring reacting against one of said parts and bearing against the other of said parts so as to urge said second portion into said hole.

* * * * *